(12) United States Patent
Campisi et al.

(10) Patent No.: US 8,436,807 B1
(45) Date of Patent: May 7, 2013

(54) SINGLE PARTICLE ELECTROPHORETIC DISPLAY AND METHOD OF MANUFACTURING SAME

(75) Inventors: Anthony J. Campisi, Melville, NY (US); Denis A. Krusos, Melville, NY (US)

(73) Assignee: Copytele, Inc., Melville, NY (US)

( * ) Notice: Subject to any disclaimer, the term of this patent is extended or adjusted under 35 U.S.C. 154(b) by 90 days.

(21) Appl. No.: 12/931,983

(22) Filed: Feb. 15, 2011

(51) Int. Cl.
*G09G 3/34* (2006.01)

(52) U.S. Cl.
USPC .......................................... 345/107; 345/105

(58) Field of Classification Search .................. 345/245, 345/247, 252–253, 265–275, 296, 107; 349/49–50, 349/105, 107, 84, 153–154, 189–190; 438/29
See application file for complete search history.

(56) References Cited

U.S. PATENT DOCUMENTS

| | | | |
|---|---|---|---|
| 4,833,464 A | 5/1989 | DiSanto | |
| 5,279,511 A | 1/1994 | DiSanto | |
| 6,113,810 A | 9/2000 | Hou | |
| 7,289,101 B1 | 10/2007 | DiSanto | |
| 2009/0066635 A1* | 3/2009 | Hong et al. | 345/107 |

* cited by examiner

*Primary Examiner* — Anh Mai
*Assistant Examiner* — Elmito Breval
(74) *Attorney, Agent, or Firm* — Office of Carl Giordano, PC.

(57) ABSTRACT

Single particle and dual-particle electrophoretic display devices are disclosed. The display comprises a back substrate including a substantially hollow container that includes a transparent substrate forming a cavity therebetween. The transparent substrate including one or more cathode electrodes forming a plurality of electronically and selectively addressable pixels; one or more side walls extending from the transparent substrate, the side walls defining corresponding pixels, and a suspension fluid including a plurality of pigment particles in fluid communication with each of the cells by a gap formed between the top of the side walls and the back substrate. In addition, the displays include a thin-film transistor (TFT) active matrix substrate to selectively drive one or more cathode electrodes. In addition, methods for manufacturing of the displays are disclosed.

32 Claims, 12 Drawing Sheets

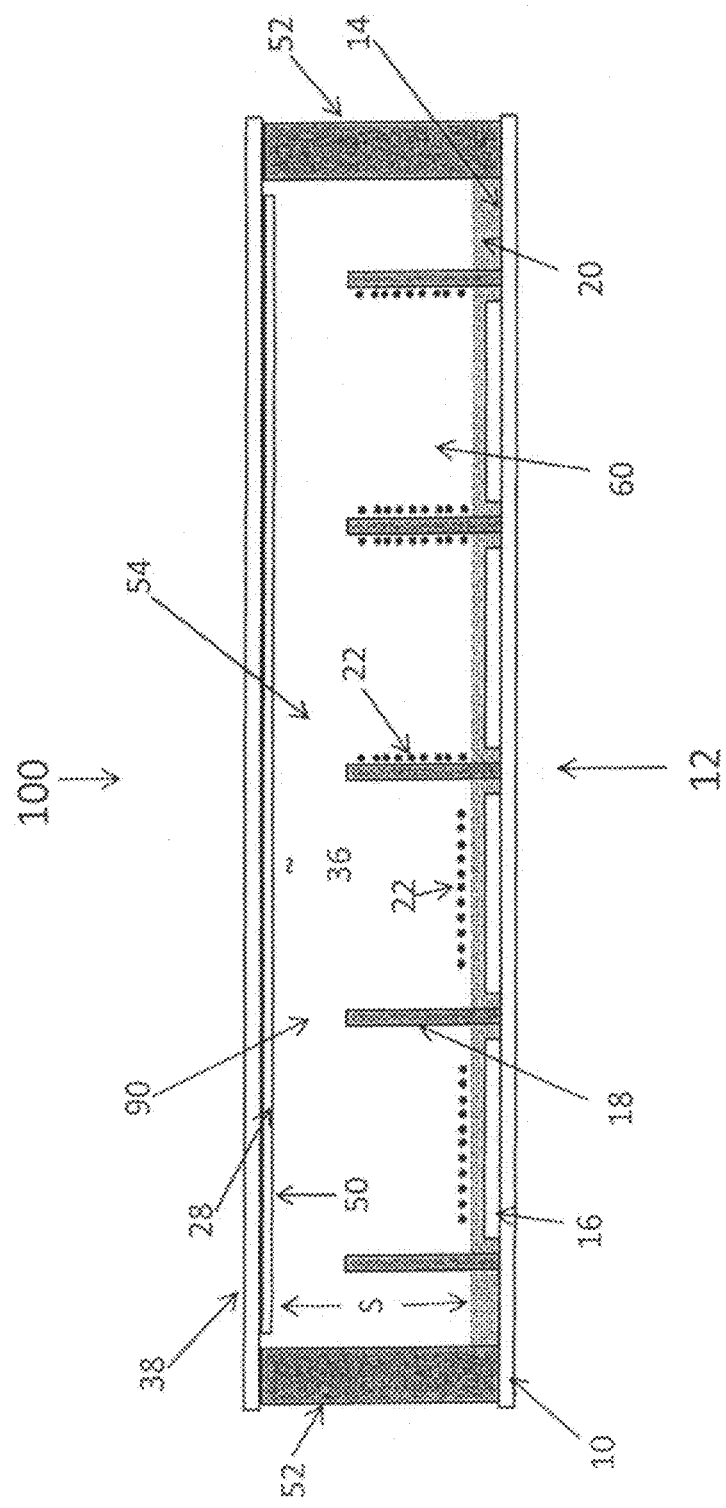

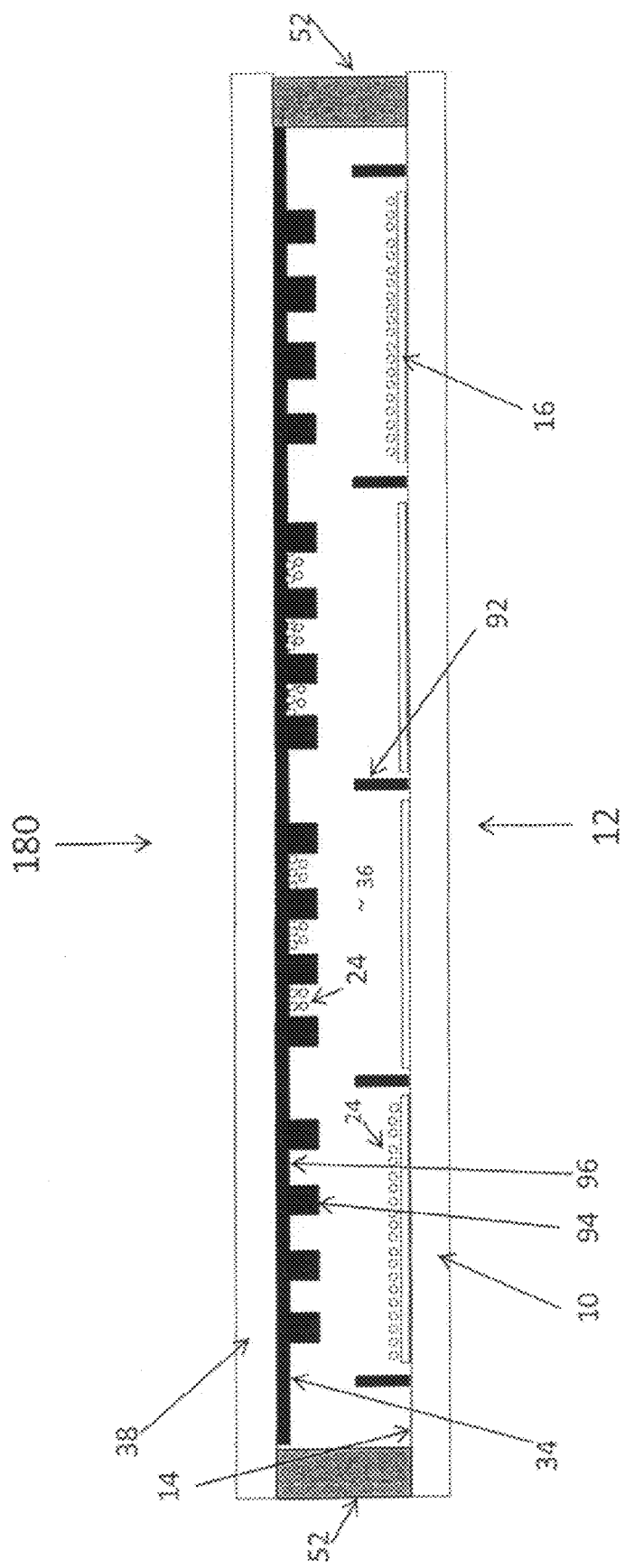

SINGLE PARTICLE ELECTROPHORETIC DISPLAY AND METHOD OF MANUFACTURING SAME

FIELD OF THE INVENTION

This invention relates generally to display devices, and, more particularly, to electrophoretic display devices.

BACKGROUND INFORMATION

The electrophoretic effect operates on the principle that when electrophoretic particles are electrically charged to a particular polarity, the charged electrophoretic particles will migrate from a surface being charged to the same polarity as the charged particles toward a surface charged to a polarity opposite to that of the charged particles. For example, particles which are positively charged will migrate from a positively charged surface toward a negatively charged surface.

Display devices that utilize the electrophoretic effect are known as electrophoretic image displays (EPIDs). For example, U.S. Pat. No. 7,289,101, titled "Multi-Color Electrophoretic Image Display", which issued on Oct. 30, 2007, and is assigned to CopyTele, Inc., is illustrative of an EPID. The EPID includes a plurality of cells, each containing electrophoretic particles, capable of displaying different colors when the particles in the cell move from a first position (e.g., rest) to a second position (e.g., display) in the cell. An electrode is coupled to each of the cells and is operative to move the particles from the first position to the second display position (or from the second position to the first position) when properly biased. In this EPID, the electrophoretic particle-containing cells are in fluid communication with one-another. In other types of EPIDs the particles are contained within sealed cells. The cells, whether sealed or partially open, (also referred to as a pixel) may be in a round, a square, a rectangular and/or honeycomb shape or other similar shapes that allow for maximizing the number of cells per unit area (e.g., hexagon, octagon).

The electrophoretic particles used in EPIDs may comprise light colored (light reflective) and/or dark colored (light absorbing) dielectric particles that are suspended in an optically contrasting clear fluid medium (suspension liquid). For example, U.S. Pat. No. 6,113,810, titled, "Methods Of Preparing Electrophoretic Dispersions Containing Two Types of Particles With Different Colors and Opposite Charges,", and assigned to CopyTele, Inc., describes a dielectric dispersion for use in a electrophoretic display that includes a dielectric fluid, a first plurality of particles of a first color having a surface charge of a selected polarity dispersed within the dielectric fluid and a second plurality of particles of a second color having a surface charge of opposite polarity to that of the first plurality and a steric repulsion thereto preventing coagulation of the first and second particles. As understood by those skilled in the art, the electrophoretic particles described herein may have optical properties that extend from totally light reflective (i.e., white) to totally non-reflective, light absorbing or opaque (i.e., black). Thus, reference to light colored particles refers to particles that have a greater light reflective property than a light absorbing property and dark colored particles refers to particles that have a greater light absorbing property than light reflecting property.

In accordance with the electrophoretic effect described above, the electrophoretic particles in the suspension liquids (fluid medium) selectively migrate to, and impinge upon, a transparent screen electrode, thereby displacing the fluid medium from the screen and creating the desired image.

EPIDs have many advantages over other types of flat panel displays. For example, EPIDs are composed of materials that are relatively inexpensive, and thus, the EPIDs are less costly to manufacture. Another advantage is that the image formed on the screen remains even when power is removed. When the electrophoretic particles or dye particles move to form an image, the image will not erase and remains on the display even after power is removed. Thus, the images created by EPIDs do not have to be refreshed as is necessary for images produced by Liquid Crystal Displays (LCDs) and other types of displays.

However, because an image is created by the movement of the electrophoretic particles within the fluid when the display is properly biased, the response time to view an image is dependent upon the time it takes the particles to move from a rest position to a display position.

Hence, there remains a need for an EPID with a faster response time that provides gray scale imaging that can be manufactured for low cost, and methods for manufacturing same.

SUMMARY OF THE INVENTION

A TFT based electrophoretic display is disclosed. The display comprises a first and second substrates that include a plurality of cells therebetween. Each of the cells containing electrophoretic particles capable of displaying at least one different color when the particles in the cell move from a first position to a second position within the cell and an electrode coupled to each of the cells, which when biased causes the particles to move from the first position to second display position (or from the second position to the first position). In one aspect of the invention, the cells are partially contained between the first and second substrates to allow for fluid communication of an electrophoretic fluid substantially particle free among the cells.

In another aspect of the invention, a method of filling an EPID with electrophoretic fluid is disclosed. In this aspect of the invention, pigment particles are deposited on a first substrate and joined to a second substrate to form a cavity between the first and second substrates. A vacuum is created between a first and second substrate, which includes a plurality of cells that are formed with side walls extending from one of the first and second substrates partially toward the other substrate. A voltage is applied to the first substrate as a substantially particle free fluid enters and is distributed throughout the cavity.

BRIEF DESCRIPTION OF THE DRAWINGS

The advantages, nature and various additional features of the invention will appear more fully upon consideration of the illustrative embodiments now to be described in detail in connection with the accompanying drawings, wherein:

FIGS. 1A and 1B illustrate a cross-sectional view of an exemplary EPIDs according to an aspect of the invention;

FIG. 7 illustrates a cross-sectional view of an EPID including cell particle containment wall according to an aspect of the invention;

Figure 1B:
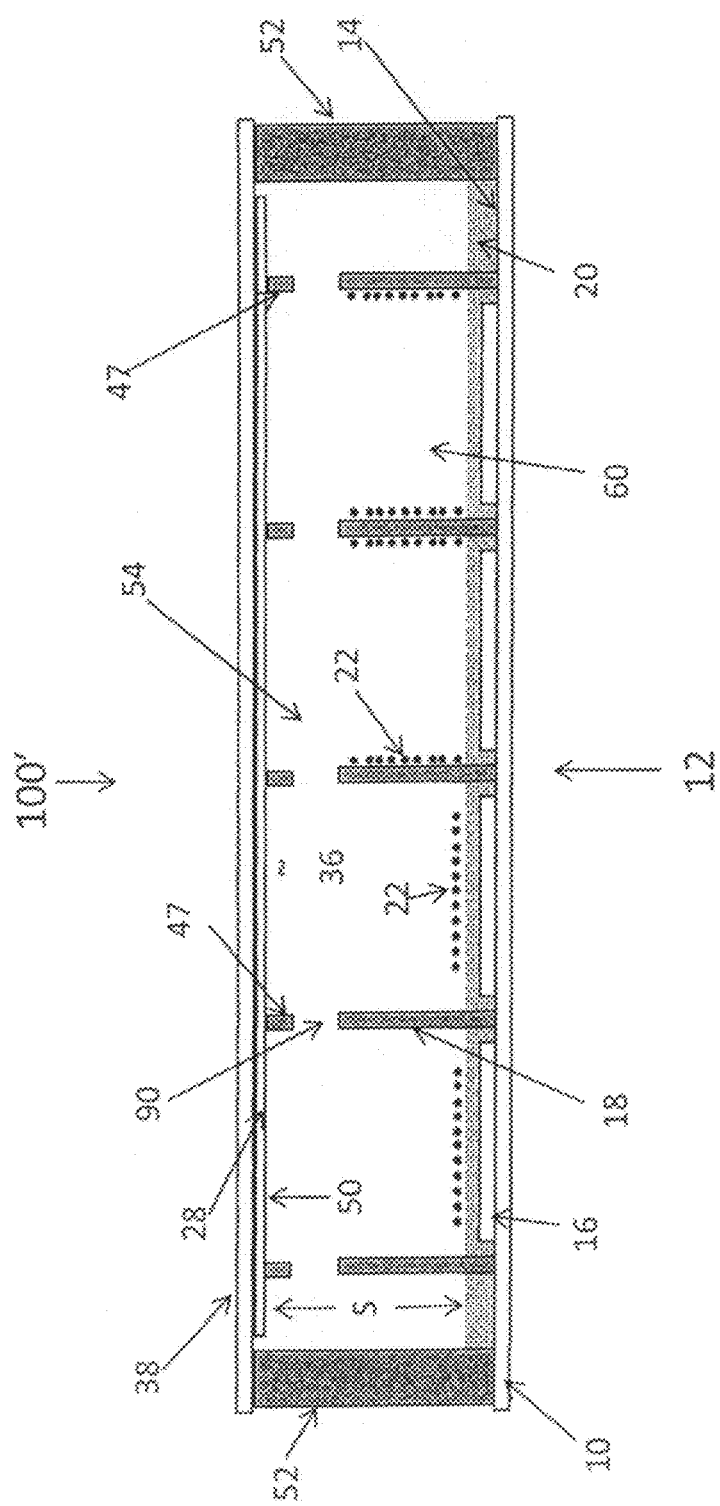

It is to be understood that the drawings are solely for purposes of illustrating the various aspects of the invention and are not intended to define the limits or scope of the invention. Throughout the drawings and the specification, like reference numerals are used to indicate common features of the described devices and methods.

DETAILED DESCRIPTION OF THE INVENTION

The terms "a" or "an" as used herein are to describe elements and components of the invention. This is done merely for convenience and to give a general sense of the invention. The description herein should be read to include one or at least one and the singular also includes the plural unless indicated to the contrary.

The term "comprises", "comprising", "includes", "including", "as", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "or" refers to an inclusive "or" and not to an exclusive "or". For example, a condition A or B is satisfied by any one of the following: A is true (or present) and B is false (or not present); A is false (or not present) and B is true (or present); and both A and B are true (or present).

FIG. 1A illustrates a cross-sectional view of an electrophoretic image display (EPID) 100, according to an aspect of the invention. The EPID 100 includes a transparent substrate layer including a thin film transistor (TFT) active matrix substrate 10 constructed from a generally planar sheet of transparent material, for example, plastic or a glass, one or more transparent cathode electrodes 16 deposited on the transparent substrate, one or more anode electrodes 18 extending substantially perpendicular from the transparent substrate, a plurality of electrophoretic pigment particles 22, a substantially clear, and substantially particle-free electrophoretic suspension fluid 36, and a layer 28 disposed on a back substrate 38 constructed from a generally planar sheet of plastic or glass, the back substrate 38 being oppositely disposed from the transparent substrate layer 10. In this aspect of the invention, the electrophoretic pigment particles 22 are illustrated and described as being dark or black and the layer 28 as reflective (e.g., white). However, it should be understood that white or light colored particles and a dark or light absorbing layer 28 may also be suitable for use according to an aspect of the invention.

Substrates 10 and 38 are sealingly assembled together with spacers 52 to form a liquid and gas-sealed multi-cell enclosure 54 located between the TFT active matrix substrate 10, the back substrate 38 and electrode layer 28, and the spacers 52. The enclosure 54 includes a space designated as "S" located between the TFT active matrix substrate 10 and the electrode layer 28 disposed on the inner surface 50 of the back substrate 38, into which an electrophoretic, substantially clear suspension fluid 36 is deposited. The height of the space S between the substrate 10 and the electrode 28 is greater than the height of the walls of the anode electrodes 18, thus permitting fluid communication among the cells 60 (FIGS. 1A and 1B). That is, anode electrodes 18, which form the walls of a corresponding cell 60, extend from substrate 10 partially toward the oppositely disposed back substrate 38 and layer 28, but do not meet or touch the back substrate 38. Thus, a gap or opening 90 is formed between the inner surface of layer 28 and the top of the anodes 18 to allow fluid 36 to be freely dispersed among the cells 60 and within the enclosure 54. The advantages of the gap formed between the top surface of the anodes 18 and the inner surface of layer 28 in the manufacturing of the EPID are described herein. As fluid 36 is substantially particle free and not viscous, only a small gap is necessary to allow fluid 36 to be distributed throughout the cavity so as to fill each of the cells with substantially the same amount of fluid.

The TFT active matrix substrate 10 and the cathode electrodes 16 are transparent to allow light to pass therethrough. According to an aspect of the invention, the anode electrodes 18 are in the form of walls that extend substantially perpendicular from the inner surface 14 of the TFT active matrix substrate 10. Cathode electrodes 16 are deposited on the inner surface 14 of the TFT active matrix substrate 10 between, and are electrically isolated from, the anode electrodes 18.

Each cathode electrode 16 is fabricated on an inner surface 14 of the TFT active matrix substrate 10 by progressively depositing onto the inner surface 14 an electrically conductive material. For example, indium-tin-oxide (ITO) is a suitable transparent material that may be used. Other suitable materials with similar transparent and conductive properties may also be utilized.

The thickness of the cathode is preferable in a range less than 1.5 microns. An insulating material layer 20 composed of a material such as, $SiO_2$, or other equivalent insulating material, including but not limited to SiO or $SiN_x$ may be applied to the cathode electrodes 16 to protect and isolate the electrodes 16 on the TFT substrate 10 from being in physical contact with the fluid 36. The insulating material layer 20 preferably has a thickness in the range of 100 Å (angstroms) to 2000 Å (angstroms). The electrically conductive cathode 16, and the transparent insulating material 20 may be deposited using conventional semiconductor deposition techniques. An additional isolation layer may also be applied to the anode 18 to protect and isolate the anode 18. In preferred embodiments of the invention the particle sizes may be in the range of ten (10) nanometers to five (5) microns.

Cathodes 16 are electrically connected to corresponding TFTs on the TFT substrate 10 through well-known connection methods, which need not be discussed in the detail (see for example, U.S. Pat. No. 7,289,101). Cathodes 16 are TFT-controlled conductors. When a selected voltage is applied, electrophoretic particles in a corresponding cell move from the cathode 16 to a corresponding anode 18, or from the anode 18 back to cathode 16. Anodes 18 are maintained at a relatively stable, non-varying, voltage level. In one aspect, the voltage on anode 18 may be set at a constant voltage between a fully "on" cathode 16 output voltage and a fully "off" cathode 16 voltage. In this manner, the electrophoretic particles may be moved in one direction when the cathode 16 is fully "on" and in the other direction when the cathode 16 is fully "off."

The anodes 18 in the form of walls 18 may be composed of a conductive material, or from an insulating material with a thin layer of conductive material disposed thereon. It should be understood that the walls may be formed from any suitable material, provided a layer of suitable conducting material is disposed thereon. Although not shown, it would be recognized at an electrical connection may be made to the anode 18 though well-known means. For example, the substrate may include a conductive layer, which is not shown in the figures, that is insulated from the TFT and cathode layers that provide electrical contact to the anodes 18. The conductive layer may include vias, electrically isolated from, and extending through the TFT and cathode layers to provide a means for providing a voltage to the anode 18. In another aspect the anodes 18 may be in direct contact with a conductive layer, which is deposited on another insulating layer deposited on the TFT/cathode layer.

Figure 2:
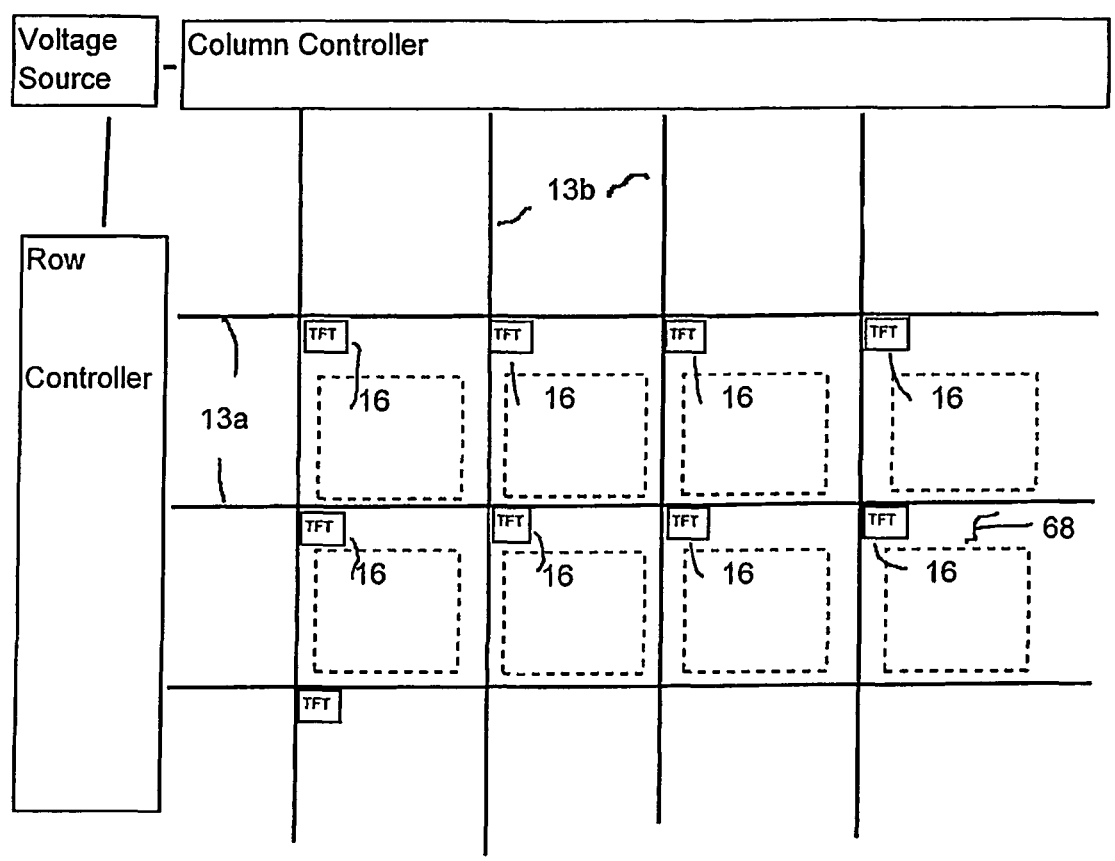
FIG. 2 illustrates a composite view of a transparent TFT active matrix substrate according to an aspect of the invention.

Referring to FIGS. 1A and 2, the anode electrodes 18, in the form of walls, are shown surrounding and interposed between each transparent cathode electrode 16 to form a cell 60. One or more cells 60 are formed by the anode electrodes 18 in conjunction with the cathode electrodes 16, and resemble an egg-crate structure. From the viewing side 12 of the device, each cell 60 defines at least one pixel, and the corresponding cathodes define the pixel apertures 68 (FIG. 2). In one aspect of the invention, a constant voltage may be applied to the cathode 16 for a selected time (i.e., a display frame time period) to set the particles in one position or another position. In another aspect of the invention, a voltage to a corresponding cathode may be varied in accordance with a selected time modulation technique or a voltage modulation technique. For example, by placing a voltage on a cathode for selected periods of time over a display frame period, a select number of the particles will migrate from the cathode to the corresponding anode. As the number of time periods increases, while maintaining a constant voltage, an increased number of particles migrate to the anode. Similarly, by varying the voltage over the frame time or selected period of the frame time, by a voltage modulation technique, only some of the particles migrate to the corresponding anode. Hence, a gray scale display may be obtained, i.e., not all pigment particles remain on the cathode 16 or anode 18 with the appropriate application of a fixed voltage over the selected time or a varied voltage over the selected time. For example, U.S. Pat. No. 4,833,464, titled "Electrophoretic Information Display (EPID) Apparatus Employing Grey Scale Capability," which is assigned to the assignee herein, discloses a time based method for providing gray scale displays. Although, gray-scaling using time-modulation or voltage-modulation is typically associated with black-white EPIDs, it would be recognized that such modulation methods may be appropriately applied to each element of colored pixel (e.g., R, G, B) of a color display to create different levels of color from each element.

By applying a voltage for a selected number of short time intervals over a display frame period, a display is provided that results in the incomplete removal of pigment from an associated selected pixel. Hence, that pixel appears darker than surrounding pixels, but not as dark as a full application of the voltage over the display frame period. The amount of particles moved and, hence, the darkness of each pixel is a function of the time duration during which appropriate voltages are applied to the rows and columns of the TFT array. In this manner, a timing generator can cause different pixels to have different degrees of darkness or grey scale values by varying the time during which the voltage is applied to the display (time-modulation). It should be understood that a controller, including, for example, a computer, microprocessor and/or dedicated hardware (e.g., ASIC, FPGA) may be used to selectively apply a voltage or current to selected ones of the cathodes for selected time periods. Similarly, the controller may apply a varying voltage to the selected cathodes for a selected time (frame time) or sub-units of the frame time.

Referring to FIG. 2, the display includes a plurality of pixels arranged in a matrix of rows 13a and columns 13b. Each pixel comprises a TFT transistor which is connected to a cathode 16 (pixel electrode). Additional electrodes of the TFT transistor are connected to the row 13a and column 13b electrodes of the associated pixel. During the updating of an image, an appropriate voltage (selection voltage) can be applied to any of the rows. When a row is selected, each column delivers a specific voltage to the pixel electrode located at the particular row and column intersection. The TFT serves as a voltage storage device, preserving the voltage at the pixel electrode, while the other rows in the matrix are being updated. The voltage that is applied to the pixel electrode (cathode) during the updating process (scanning process) relative to the anode electrode controls the back and forth movement of the charged electrophoretic particles between the anode electrode and the pixel electrode (cathode) for the respective pixel in the row and column matrix. It should be understood that a voltage source or current source may also be used to apply an appropriate voltage or current to the anode and TFT elements (or the cathode 16 directly) to achieve a potential difference between the anode and cathodes. For example, the voltage source may be a direct current source that generates a single or multiple voltages, or an alternating current source that is rectified to generate one or more direct current sources. The current source may be a direct current or alternating current source that provides appropriate voltage to the corresponding electrodes.

In addition, a controller (shown as a row controller and a column controller) may be incorporated to selectively apply a voltage (or current), from the illustrated voltage source, to selected TFTs in corresponding rows and columns of the TFT array. A suitable controller may be computer or microprocessor including code which directs the output of the voltage source to one or more selected rows and columns. Alternatively, the controller may be dedicated hardware (ASIC, FPGA) that directs the output of the voltage source to one or more selected rows and columns.

Referring back to FIG. 1A, when charged dark or black electrophoretic particles 22 are attracted to one or more anode electrodes 18, light is allowed to travel through the substantially clear, substantially particle free, electrophoretic suspension fluid 36 and is reflected off the reflective white electrode layer 28 on the back substrate 38 making a pixel appear white when viewed through viewing side 12 (FIG. 1) or pixel aperture 68 (FIG. 2). When the charged dark electrophoretic particles 22 are attracted to one or more transparent cathode electrodes 16, light is blocked, making the pixel appear black when viewed through pixel aperture 68. By moving back and forth from the walls formed by the anode electrodes 18, to and from the cathode electrodes 16, the electrophoretic particles 22 essentially act as a light shutter.

Advantageously, the one or more cells 60 formed by the walls of the anode electrodes 18, in conjunction with associated cathode electrodes 16, tend to isolate the electrophoretic pigment particles 22 from one another, thereby improving the electrical, colloidal, operational, and life-time stability of the EPID 100. Moreover, the cells 60 can be easily dimensioned to provide hundreds of pixels per inch, thereby enabling one to obtain extremely fine resolution, and to create high resolution display capabilities.

Since the anodes 18 in the form of walls are viewable through the viewing surface 12, the thickness of the walls should be kept to a minimum width to provide a maximum amount of usable viewing surface. In one aspect of the invention, the thickness of the anodes 18 may be determined as a function of the space between the TFT layer 10 and the inner surface of the back layer 38, including any additional layers disposed thereon. In one aspect of the invention, the thickness of the anode 18 may be selected to be proportional to the distance (space) between the substrates that form the cavity. For example, the thickness/space ratio may be approximately 1:10, or less to effectively reduce areas that would not otherwise be usable on the display.

Referring to FIG. 1B, there is shown another exemplary EPID 100' in accordance with an aspect of the invention. In this illustrated example, one or more walls 47 extending substantially perpendicular from the inner surface of layer 28 are disposed substantially opposite from the anodes 18 in the form of walls extending from the transparent substrate 10. In this illustrated aspect of the invention, which may be referred to as a split-wall configuration, walls 47 provide for further containment of the particles 22 in a corresponding cell. As illustrated, a gap 90' exists between the top surface of the anodes 18 and the lower edge of walls 47 to allow for the substantially uniform distribution of fluid 36 throughout the display.

According to an aspect of the invention, the layer 28 (FIGS. 1A and 1B) disposed on the inner surface 50 of the back substrate 38 may be formed of a conductive material. In this aspect, application of a voltage to layer 28 provides for initializing and/or resetting the display or the deposition of particles during the manufacturing process. Application of a voltage to an electrically conductive layer 28 further provides for the initial distribution of the electrophoretic dark or black pigment particles 22. In one aspect of the invention, the walls 47 may be formed of a material with conductive properties similar to that of layer 28, or may formed of a different material with different conductive (or non-conductive) properties. For example, walls 47 may be a non-conductive material when layer 28 is a conductive material.

The particles described herein are organic or inorganic particles suitable for use in electrophoretic displays. For example, the dark electrophoretic pigment particles 22 may include, but are not limited to: carbon black, carbon nanotubes, iron oxide black, lamp black, Zn—Fe—Cr brown Spinel, Magnesium Ferrite, green Spinel, chromium oxide Green, Indanthrone Blue, Ultramarine Blue Dioxazine Violet, Quinacridone Violet, Anthraquinoid Red, and Perylene Red. Light electrophoretic pigment particles 24 suitable for use in the EPIDs may include, but are not limited to: titanium dioxide, zinc oxide, silica, zinc sulfide, calcium silicate, alumina hydrate, Diarylide Yellow, Arylide Yellow, Diarylide Orange, and Perinone Orange.

Figure 3:
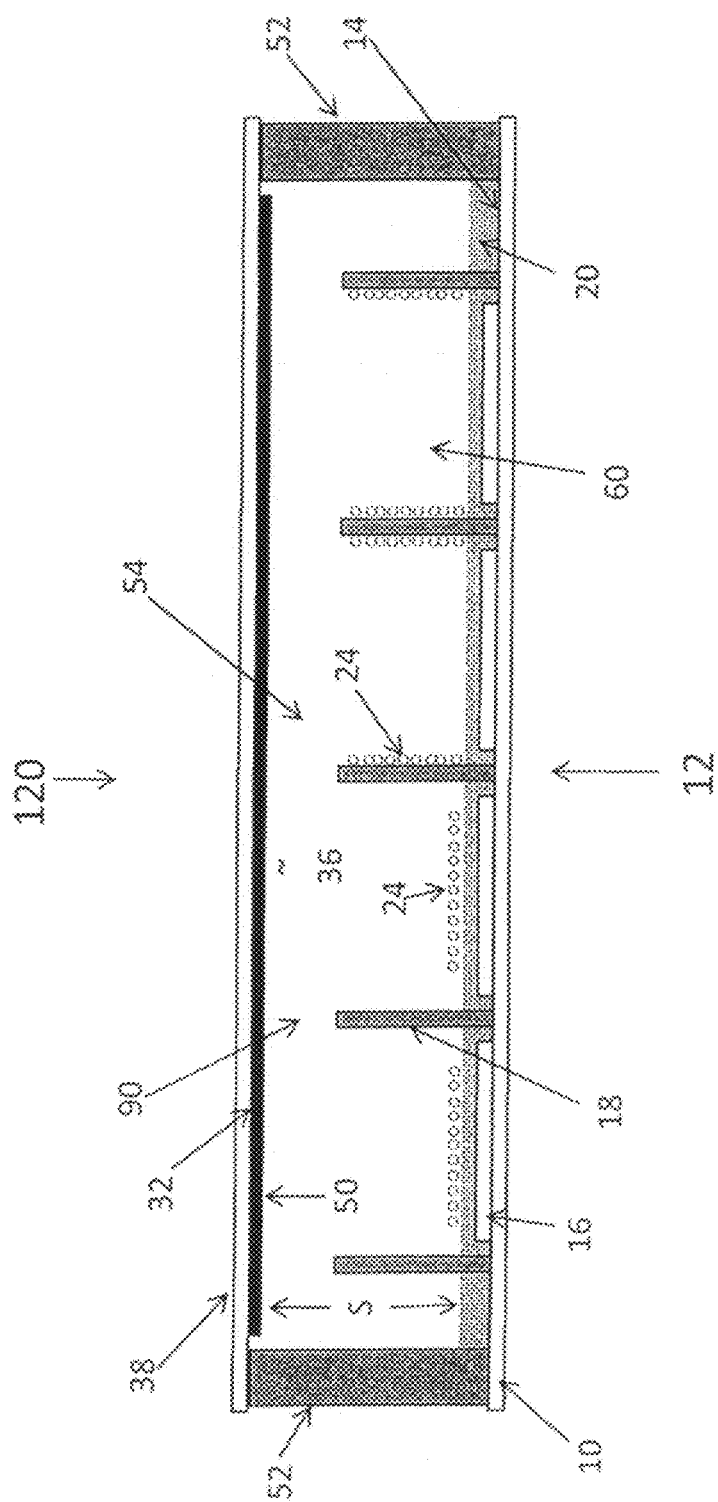
FIG. 3 illustrates a cross-sectional view of an EPID according to an aspect of the invention.

FIG. 3 illustrates an EPID 120, according to another aspect of the invention. In this aspect, a black electrode layer 32 is disposed on a back substrate 38, and the electrophoretic particles are reflective white particles 24. When the charged white reflective electrophoretic particles 24 are attracted to a side wall of an anode electrode 18 from an associated cathode 16, the pixel appears black when viewed through viewing surface 12 (the black electrode 32 is being viewed through the pixel aperture. Alternatively, when the charged reflective white particles 24 are attracted to the transparent cathode 16, the light is reflected off the surface of the white particles, making the pixel appear white when viewed through viewing surface 12.

It should be understood that the polarity of the white particles 24 is different than the polarity of the black particles 22 in FIGS. 1A and 1B, and thus, the polarity of the voltage difference required for the EPID illustrated in FIG. 3 is opposite from the voltage difference disclosed previously with regard to FIGS. 1A and 1B.

Figure 4:
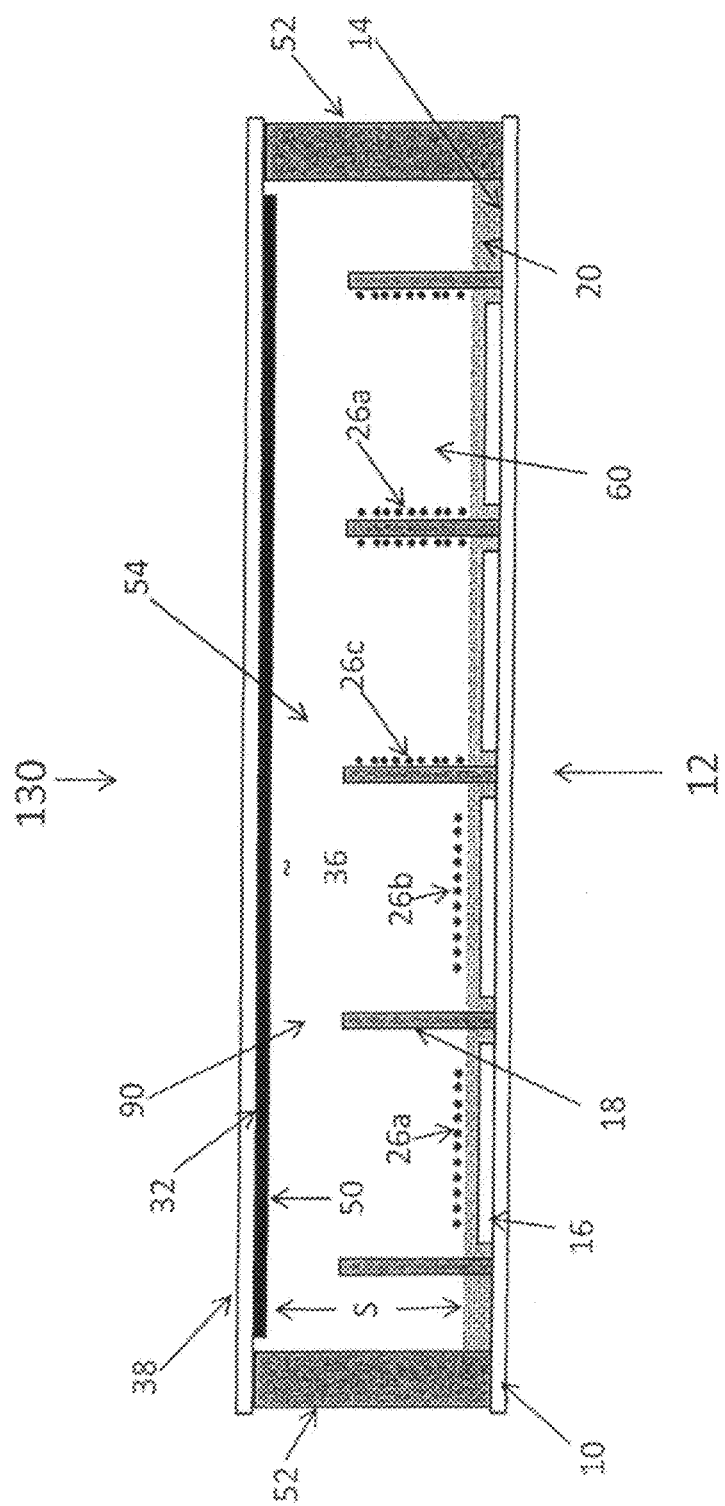
FIG. 4 illustrates a cross-sectional view of an EPID according to an aspect of the invention.

FIG. 4 illustrates an EPID 130 in accordance with another aspect of the invention. In this aspect, an opaque black electrode layer 32 is disposed on a back substrate 38. According to this aspect of the invention, the reflective electrophoretic particles 26*a-c* are colored particles. For example, the particles selected may be a particle that reflects a red color, reflects a green color, and reflects a blue color, respectively. It should be understood that the colors described herein are only for describing an aspect of the invention, and that particles of other colors may suitably be used.

The reflective electrophoretic particles 26*a-c* may be deposited on the TFT active matrix substrate 10 by a conventional electrophoretic deposition process. As illustrated, the reflective electrophoretic particles 26*a-c* are isolated and separated from one another within respective cells 60. When any of the charged electrophoretic particles 26*a-c* are attracted to a corresponding anode electrode 18 (wall) from a corresponding cathode 16, the pixel appears black when viewed through viewing surface 12 (or pixel aperture 68 in FIG. 2), as the black electrode 32 is being viewed. However, when any of the colored particles 26*a-c* are attracted to the transparent cathode 16, the light is reflected off the surface of the particles, making the pixel appear the color of the particle, e.g., red, green or blue, when viewed through the respective pixel aperture 68.

It should be understood that the walls 47 (FIG. 1B) may be incorporated into the EPID illustrated in FIGS. 3 and 4 to provide for further containment of the particles 24 or 26*a-c*, respectively.

Figure 5A:
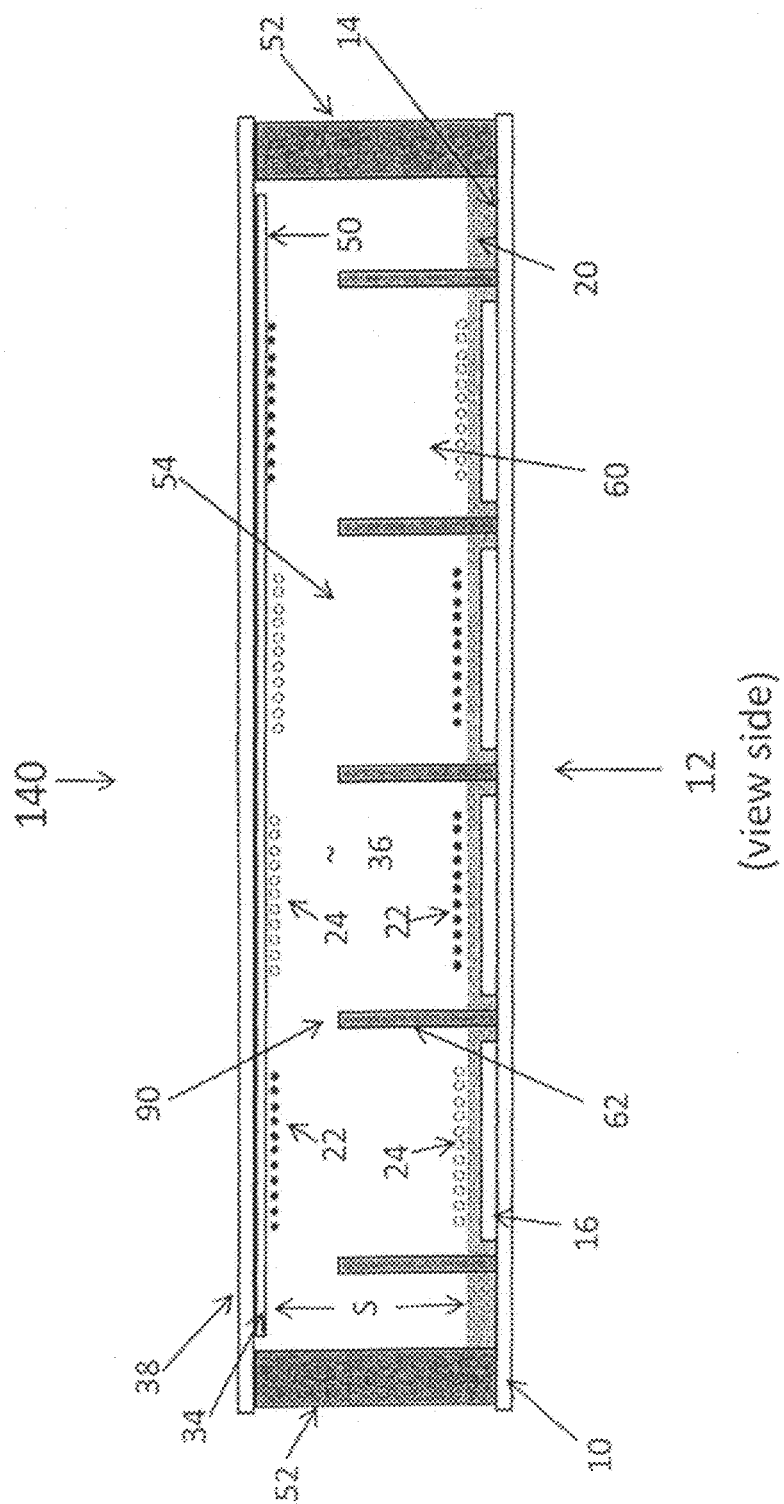
FIGS. 5A and 5B illustrate cross-sectional views of a dual-particle EPID according to an aspect of the invention.

FIG. 5A illustrates a cross-sectional view of an EPID 140 in accordance with another aspect of the invention. In this aspect, which may be referred to as a dual-particle EPID, a transparent cathode electrode 16 is disposed on the TFT substrate 10 and an anode electrode layer 34 is disposed on a back substrate 38. In addition, both dark (e.g. black) particles 22 and light (e.g., reflective white) particles 24 are deposited on respective opposing surfaces. According to this aspect of the invention, for any given pixel, depending upon the respective voltages of the anode layer 34 and the transparent cathode 16, the reflective white particles 24 will be attracted to the cathode 16, and the black particles 22 to the anode layer 34 on the back substrate 38, making the pixel appear white, or alternatively, the black particles 22 will be attracted to the cathode 16, and the reflective white particles 24 to the anode layer 34 on the back substrate 38, making the pixel appear black.

In this aspect, the one or more separation walls 62, in conjunction with a cathode 16, form a cell 60. Still referring to FIG. 5A, the separation walls 62 are in the form of a frame or mesh surrounding each cathode electrode, as illustrated, or may surround a plurality of cathode electrodes, and are formed of a suitable material, for example, a non-conductive material, to contain particles within respective cells. The separation walls extend from the substrate 10 partially toward the electrode layer 34 but do not meet or touch the electrode layer 34. The opening or gap formed therebetween allows for fluid communication among the cells. It should be understood that walls 47 illustrated in FIG. 1B may also extend from the inner surface of electrode layer 34 to provide further containment of the particles 22, 24 within a corresponding cell. This split-wall design also provides a gap through which fluid 36 may be distributed among the cells. It should be understood that the separation walls may also be made of a conductive material to allow for a voltage to be applied to attract particles, as previously described.

Figure 5B:
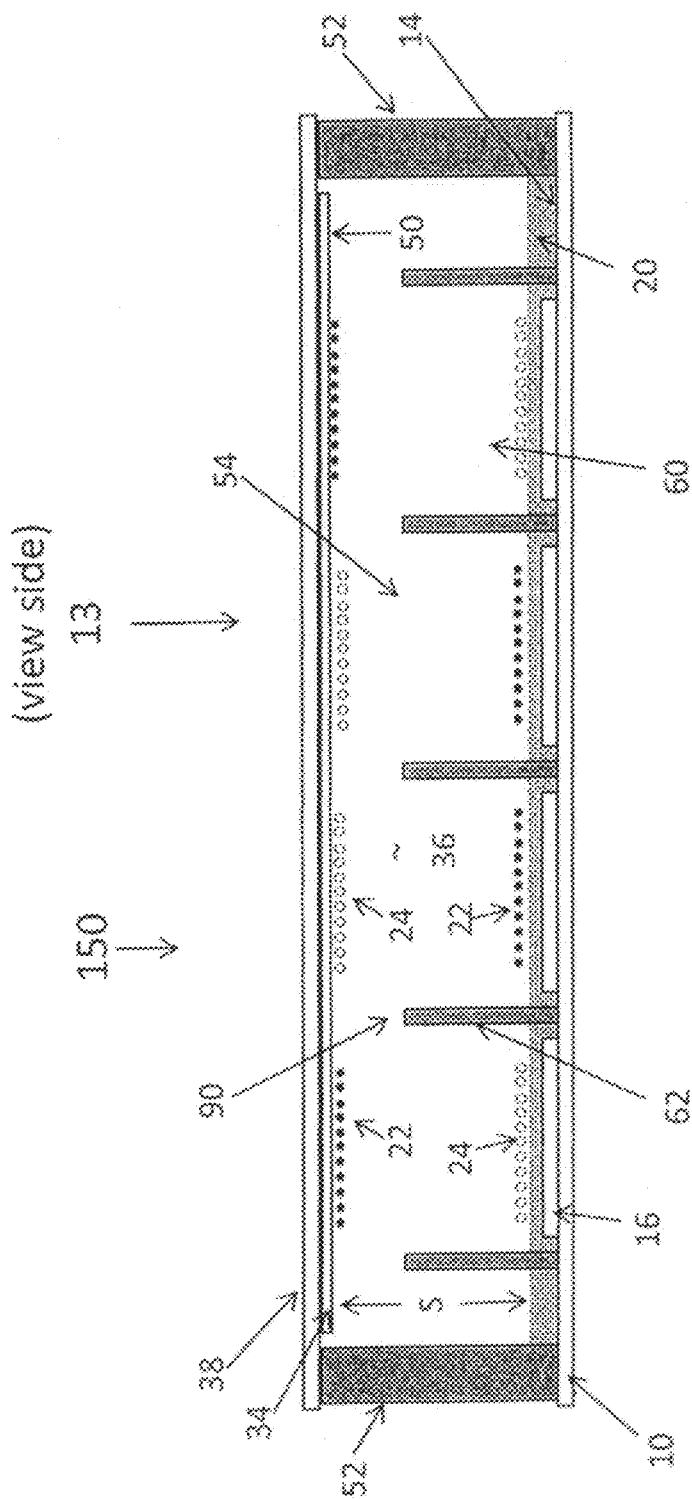

FIG. 5B illustrates a cross-sectional view of an EPID 150 in accordance with another aspect of the invention. In this aspect, on the viewing side 13 an anode electrode layer 34 is disposed on a back substrate 38 and a cathode layer 16 is deposited on a TFT layer 10, in which both black and reflective white particles, 22 and 24 are deposited on respective opposing surfaces. According to this aspect of the invention, for any given pixel, depending upon the respective voltages of the transparent anode layer 34 and cathode 16, the reflective white particles 24 will be attracted to the cathode 16, and the black particles 22 to the transparent anode layer 34 on the back substrate 38, making the pixel appear black. Alternatively, the black particles 22 will be attracted to the cathode 16, and the reflective white particles 24 to the transparent anode layer 34 on the back substrate 38, making the pixel appear white. In this aspect, the one or more separation walls 62, in conjunction with a cathode 16, form a cell 60. The separation walls are in the form of a frame or mesh surrounding each cathode electrode or a group of cathode electrodes, and are formed of a suitable non-conductive material, and are less than the height of space S to allow for the fluid communication between the walls as described previously.

Figure 6A:
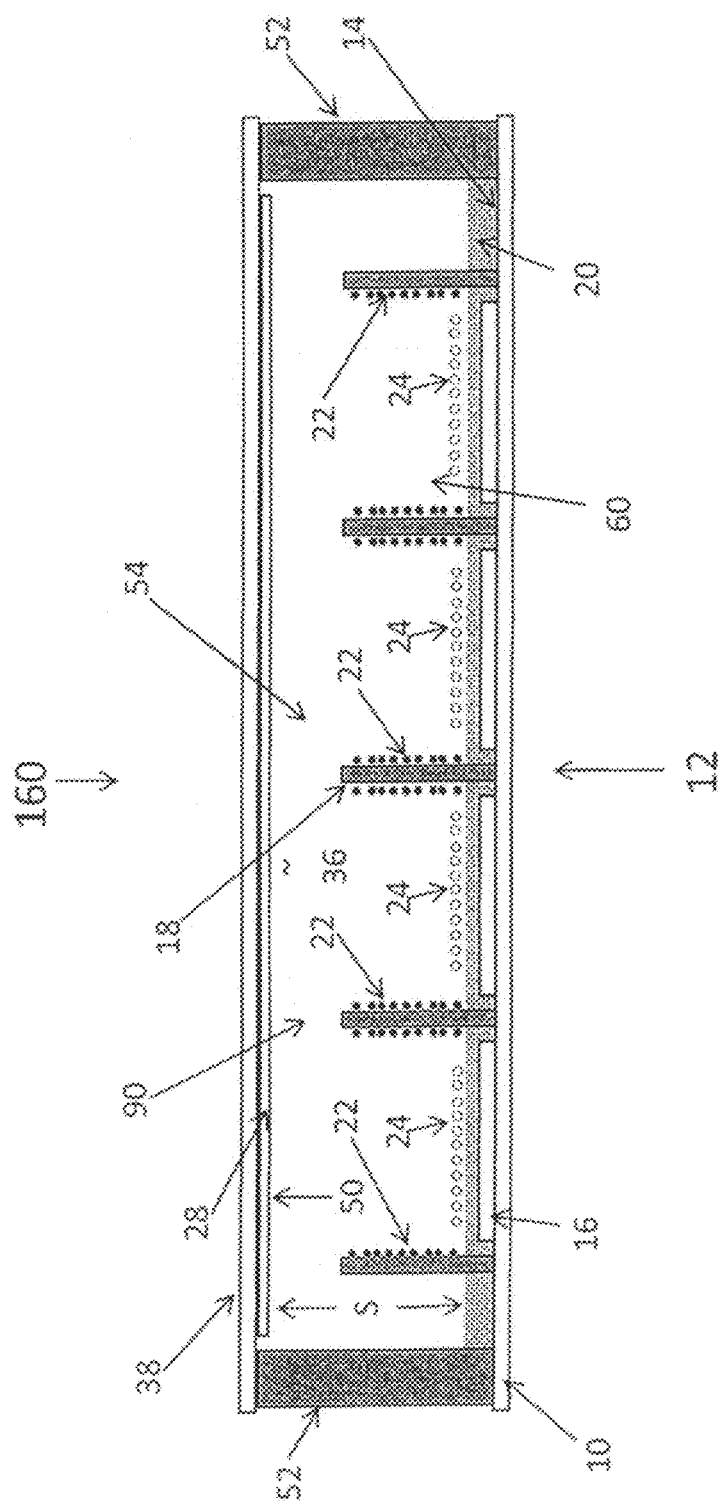
FIGS. 6A and 6B illustrate cross-sectional views of another aspect of a dual-particle EPID according to an aspect of the invention.
Figure 6B:
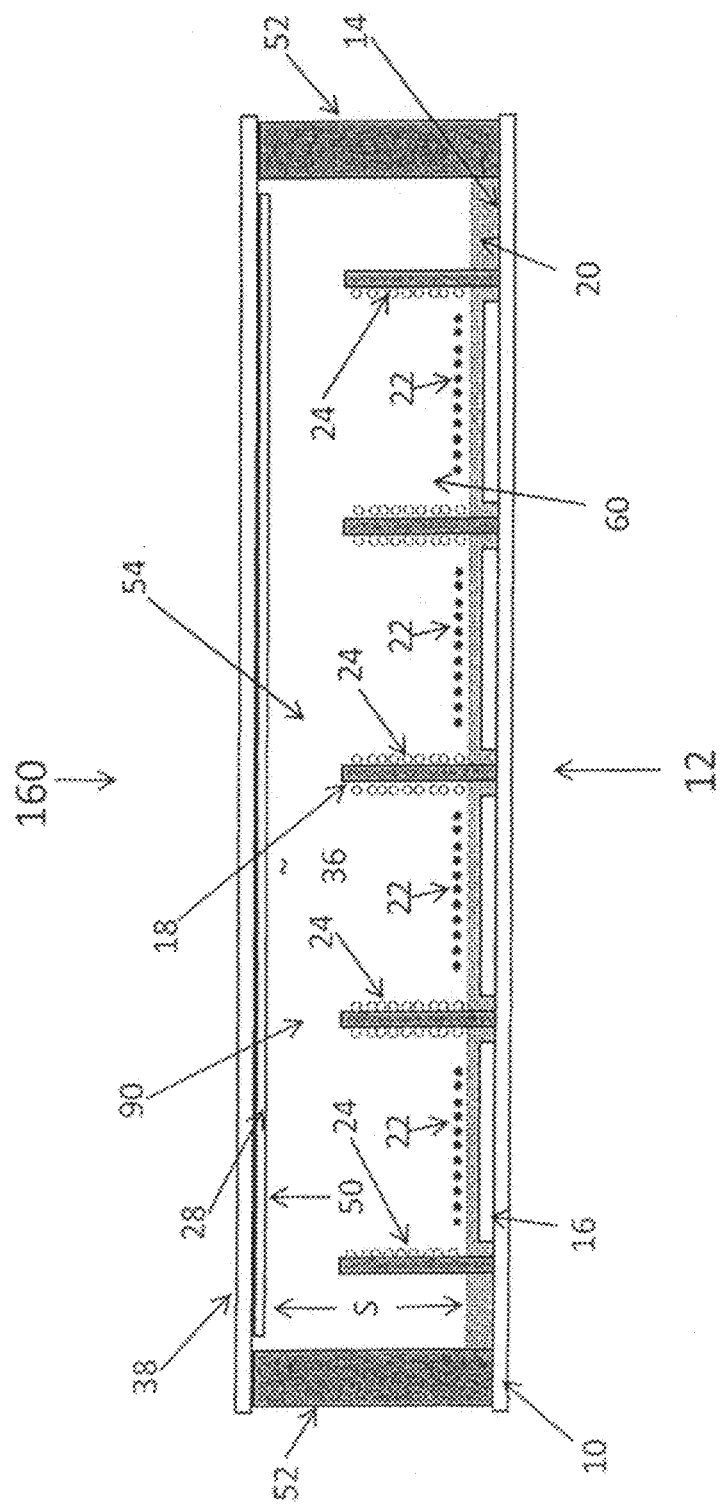

FIGS. 6A and 6B illustrate a cross-sectional view of another aspect of the invention including a dual-particle electrophoretic display.

According to this aspect, particles having two different electrical charges are included within each cell. The anode electrodes 18 are charged to a known voltage as previously described. When the voltage applied to the cathode 16, through the corresponding TFT circuit is less than the voltage on the anode 18, particles having a first electrical charge are attracted to the anode 18 (e.g., particles 22), while particles (e.g., 24) having a second electrical charge are attracted to the cathode 16 (FIG. 6A). When the voltage applied to the cathode 16 is greater than the voltage applied to the anode 18, then the particles having the second electrical charge (e.g., 24) are attracted to the anode 18, while the particles (e.g., 22) having the first electrical charge are attached to the cathode 16 (FIG. 6B). Thus, in the former case, the pixel would appear to have the color of the particles having the second electrical charge, while in the latter case, the pixel would appear to have the color of the particles having the first electrical charge. While the most dramatic effect occurs when the particles are selected to be black and white, wherein the pixel is either black or white, when viewed from either side, it should be understood that alternative operations may be performed using electrically charged particles with any combination of colors, ranging between fully reflective and fully absorptive.

FIG. 7 illustrates a cross-sectional view of an EPID 180 according to another aspect of the invention. The EPID 180 includes a TFT active matrix substrate 10, with a front viewing side 12, transparent cathode electrodes 16, and a plurality of pixel separation walls 92 disposed between and surrounding each cathode 16 (or a group of cathodes 16). The cathode electrodes 16 and separation walls 92 are disposed on the inner surface 14 of the substrate 10. In this aspect, an insulation layer 20 is not used, as in FIG. 1A. It should be understood that insulation layer 20 may be optionally included in the EPIDs illustrated and described herein.

The EPID 180 includes a back substrate 38 with a dark anode electrode 34 disposed on the inner surface thereof. Disposed on the inner surface of the dark anode electrode 34 is a plurality of separation walls 94. The separation walls 94 are contained within the projection of the separation walls 92 onto the back electrode. In this aspect, white electrophoretic particles 24 may be suspended in a clear electrophoretic suspension fluid 36, or may be deposited, prior to sealing the TFT active matrix substrate 10 and the back substrate 38, on the TFT substrate 10 or the back substrate 38 by conventional electrophoretic deposition processes. The EPID may then be filled with a clear, substantially particle-free electrophoretic suspension fluid 36 after sealing the TFT active matrix substrate 10 and the back substrate 38 together.

The cathode electrodes 16 are separated from one another by the separation walls 92 that extend in a substantially perpendicular direction from the TFT active matrix substrate 10. Pixel separation walls 92 are in the form of a mesh-like structure. The separation walls 94 disposed on the dark anode electrode 34 surround and cross each cathode electrode 16 within a respective pixel area. Between two adjacent walls 94 are wells 96 that contain and hide the white particles 24. When the reflective white particles 24 are attracted to the anode 34, the particles 24 are contained within the wells 96 and the respective pixel appears dark (the color of the walls 94). When the reflective white particles 24 are attracted to the cathode 16, the respective pixel appears white. The separation walls 94 are advantageous as they provide wells 96 for containment of the particles within the pixel. In addition, it should be understood that walls 47 illustrated in FIG. 1B may also be incorporated into the EPID 180 to provide for further containment of the particles within the cell.

According to another aspect of the invention, a method for manufacturing the EPIDs herein is described and illustrated The method includes, prior to the step of sealing the TFT active matrix substrate 10 and the back substrate 38 about the perimeters thereof and filling the sealed container or cavity with a substantially clear, substantially particle-free, electrophoretic suspension fluid 36, a plurality of electrophoretic particles 22 may be deposited on the TFT substrate 10 or the back substrate 38 by conventional electrophoretic deposition processes. This is accomplished because the height of the anode electrode 18 is less than the height of the space S which forms a gap therebetween to allow the clear electrophoretic suspension fluid 36 to be added in an efficient manner. The gap provides for fluid communication among cells. In one aspect of the invention, the height of the space S may be approximately 10 um and the anode height may be approximately 7 um. The differences in height provides a sufficient gap so that in instances where the particles are deposited prior to filling with the electrophoretic suspension fluid, the cavity or hollow EPID can be easily filled with the electrophoretic suspension fluid with the aid of a partial vacuum. A voltage may be applied to the substrate(s) during the deposition of the particles using conventional electrophoretic deposition techniques to maintain the particles in place. In addition, during the filling process, a voltage may be re-applied to maintain the deposited particles in place as the fluid is being added to the cavity between the first and second substrates.

The manufacturing of EPIDs is disclosed in U.S. Pat. No. 5,279,511, titled "Method of Filling an Electrophoretic Display," which issued Jan. 18, 1994, and is assigned to CopyTele, Inc. In this patent, two electrode plates separated by spacers create a cavity in which a fluid, contain electrophoretic particles, is dispersed. A voltage difference is applied to the electrodes to create an electrophoretic effect to collect the particles at one electrode or the other. The particular electrode to which the particles collect is determined by the particle charge and the voltage difference. Thereafter, the fluid is drained, the device is then disassembled to enable the particles to dry in place and then the device is reassembled. A clear suspension fluid is then introduced into the assembled EIPD. The process has been found to be both time consuming and costly as the step of disassembling and drying are additional steps that increase the cost and the amount of time to fabricate the EPID.

In accordance with an aspect the invention, electrophoretic particles are deposited on an electrode plate (substrate) by the application of a voltage to the plate and then the plate is combined with a second substrate to create a cavity between the two plates. In this case, the voltage applied to the plate may be maintained or may be removed during the assembly process.

The cavity formed between the two plates may be void of any structure or may include structure with cells that are formed with side walls extending substantially perpendicular from one of the electrodes so as to form a gap between the top of the side wall and the opposing plate (electrode) (FIG. 1A) or the cells may be constructed using a split gap side wall (FIG. 1B). After sealing the cavity formed by the first and second plates (substrates) about the perimeter, a voltage difference is then maintained between the two plates to retain the deposited particles in place. A partial vacuum (i.e., a desired level of vacuum) is then created within the cavity by drawing the enclosed air out using conventional methods of evacuation. A clear suspension fluid is then injected, or drawn, into the partially evacuated cavity. In one aspect the fluid may be injected under pressure into the cavity. In another aspect the fluid may be drawn into the cavity by a combination of the created partial vacuum and capillary action.

With the gap created between the cell side walls and the opposing plate, the clear suspension fluid may be distributed through the cavity. In addition, the applied voltage difference during the filling process causes the deposited particles to remain in place. Hence, a more uniform distribution of particles and suspension fluid is achieved, as the particle placement is not disturbed as the suspension fluid occupies the unfilled space within the cavity. In another aspect of the invention, the filling process may be performed without the application of a voltage. In this case, the particles may be held in place by Vanderwaal forces.

In another aspect of the invention, the air may be evacuated from the cavity while the suspension fluid is concurrently injected or drawn. In this case, the rate of injecting the fluid must be more accurately controlled to avoid the fluid being drawn out by the evacuating process.

Figure 8:
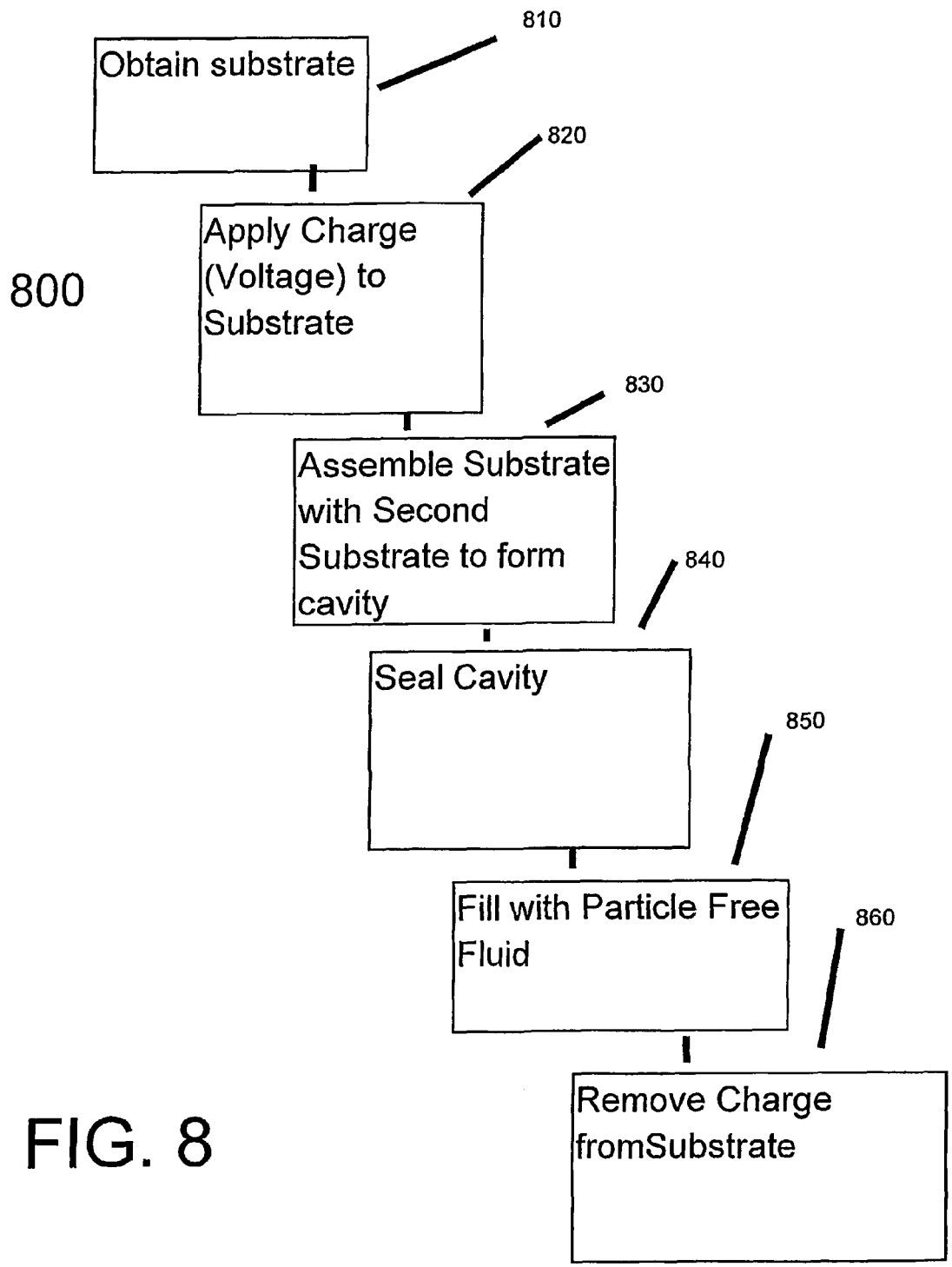
FIG. 8 illustrates a flowchart of a first method of manufacturing an EPID according to an aspect of the invention.

FIG. 8 illustrates a flow chart 800 of an exemplary manufacturing process in accordance with a first aspect of the invention. In this aspect, a single particle EPID is fabricated (e.g., FIG. 1A, 1B). At step 810, an electrically conductive plate (or substrate) is placed on a holder. At step 820, in one aspect of the invention, a voltage is applied to the plate as a fluid containing electrophoretic particles contacts the plate. The voltage causes the particles to be deposited, and be retained, on the surface to the plate. It should be understood that the voltage used depends on the electrical charge of particles that are being deposited on the plate or substrate.

At step 830, the plate having particles deposited thereon is assembled with, but separated from, a second plate to form a cavity therebetween. The two plates may be separated by spacers to maintain a desired distance between the two plates (i.e., substrates). The spacers may be formed of a non-conductive material. Alternatively, the spacers may be formed of a conductive material that is electrically isolated from the electrically conductive elements on one or both of the plates.

At step 840, the cavity is sealed and the air in the sealed cavity is withdrawn. At step 850, a voltage may then be applied to the substrate to maintain the deposited particles in place as a clear suspension fluid is injected, or drawn, into the evacuated cavity. At step 860, the applied voltage may be removed.

Figure 9:
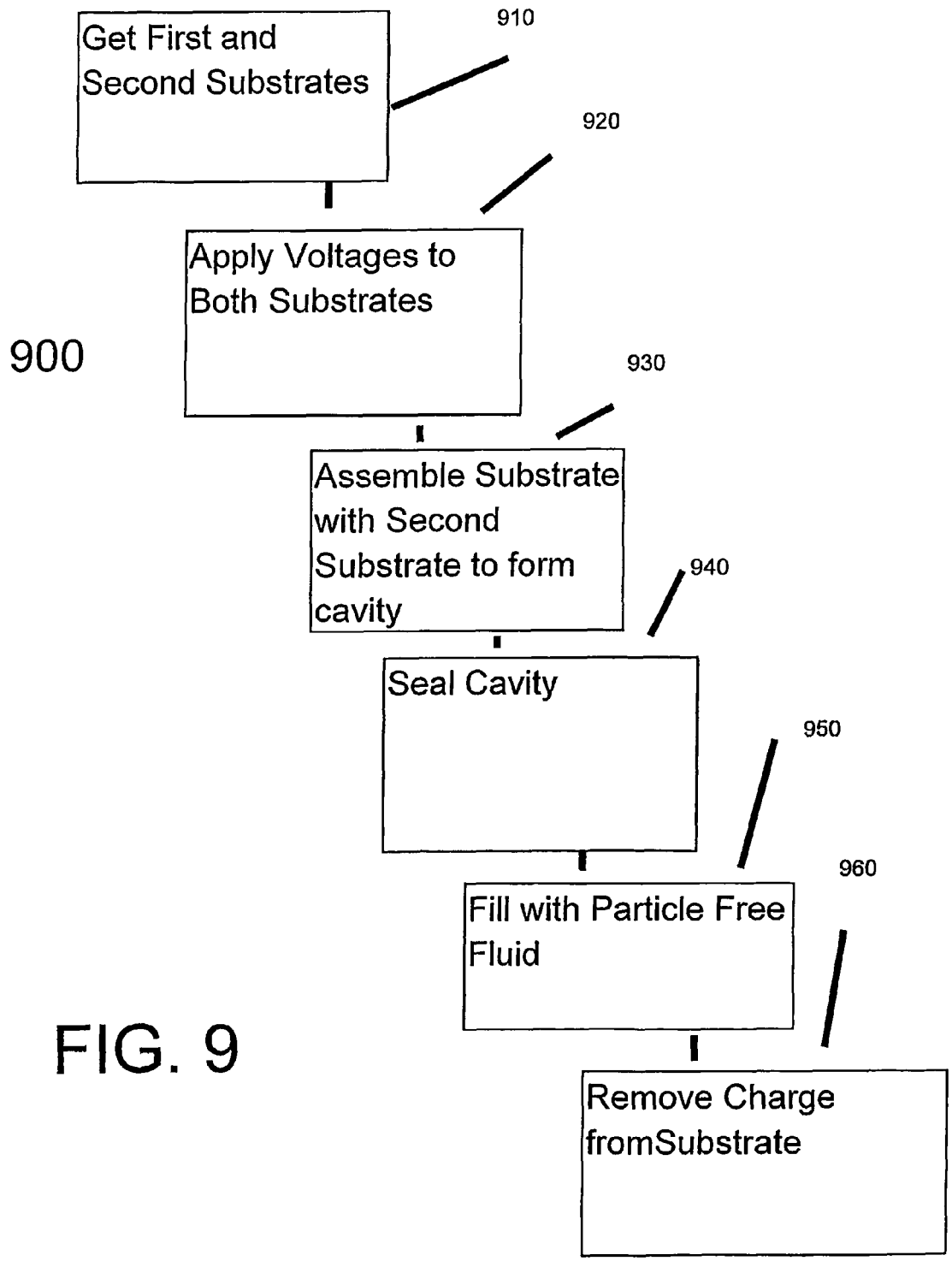
FIG. 9 illustrates a second method of manufacturing an EPID according to an aspect of the invention.

FIG. 9 illustrates a flow chart 900 of an exemplary manufacturing process in accordance with another aspect of the invention. In this aspect of the invention, a dual-particle EPID (e.g., FIGS. 5a-5b and 6a-6b) is fabricated. At step 910, an appropriate voltage is applied to each of electrically conductive plates that are to be used as the substrates of the EPID in a manner as described with regard to step 810. At step 920, electrically charged particles are attached to corresponding ones of the electrically charged plates. Steps 930-960 are similar to the steps 830-860 and, need not be further described.

The advantages of the EPID presented herein are:

1. The incorporation of a TFT substrate for rapid scanning operation. This allows for high resolution gray scale images with a very fast response time.

2. The partial walls that separate the pixel cells allow the EPID to be filled very efficiently. This is because the electrophoretic particles can be deposited on the surface of the substrates prior to filling. Therefore when filling the EPID only a substantially particle free electrophoretic fluid needs to be added. This can be done because all the cells are in fluid communication with one another. As the particle free electrophoretic fluid is not viscous, only a small gap is necessary. The small gap between the opposite electrode results in lower operating voltages (because of the relatively higher electric fields), and a short distance between the anode and cathode electrodes. This short distance translates into a fast response time because of the higher electric field and the shorter distance that the particles travel.

3. Since the separation walls are not very high they need not be very wide. This allows for a very high contrast because very little of the pixel area is wasted on the cell separation walls.

4. The separation walls also help contain the particles in a respective pixel cell. The particle containment may be further enhanced if there are partial separation walls on both the anode and cathode substrates.

The instant application has referred to US Patents that have issued and are assigned to the Assignee of the instant application to provide background materials regarding the subject matter claimed as the invention. The teachings of the aforementioned referred-to US Patents are incorporated by reference, as if stated in full, herein.

While there has been shown, described, and pointed out, fundamental novel features of the present invention as applied to the various embodiments thereof, it should be understood that various omissions and substitutions and changes in the apparatus and methods described, in the form and details of the devices disclosed, and in their operation, may be made by those skilled in the art without departing from the spirit of the present invention. For example, it is expressly intended that all combinations of those elements which perform substantially the same function in substantially the same way to achieve the same results are within the scope of the invention. Substitutions of elements from one described embodiment to another are also fully intended and contemplated.

For example, while the invention has been shown and described with regard to the substantially perpendicular anodes 18 and/or separation walls 92 extending from the transparent electrode, it should be understood that the anodes 18 or separation walls 93 may extend from the back substrate according to an aspect of the invention. In addition, while the invention has been shown and described with regard to a voltage being applied to the cathode to control the disposition of charged particles, it should also be within the knowledge of those skilled in the art to apply the TFT based control voltage to the anodes to control the initial particle disposition, prior to filling with a suspension fluid. In addition, while the invention has been described with regard to a reflective or an opaque back substrate, it should also be within the knowledge of those skilled in the art to form a EPID having a transparent back substrate, and a reflective and/or opaque substrate having cathode elements thereon.

What is claimed is:

1. A display comprising:
a first substrate, including:
a plurality of first walls extending substantially perpendicular from an inner surface of said first substrate, said plurality of first walls forming a plurality of cells;
a plurality of electrically conductive elements, each conductive element being associated with a corresponding one of said plurality of cells, said electrically conductive element being electrically isolated from each of said plurality of walls; and
a transparent thin-film (TFT) structure disposed on an inner surface of said first substrate, said TFT structure being arranged in a plurality of rows and columns, wherein an intersection of one of said rows and one of said columns corresponds to one of said plurality of electrically conductive elements;
a second substrate, separated from the first substrate by a selected distance and forming a cavity between said first and said second substrate, said plurality of first walls having a height less than said cavity, wherein a gap is formed in an area between an upper surface of said plurality of said first walls and an inner surface of the second substrate;
a substantially clear, substantially particle free, suspension fluid disposed within said cavity, said suspension fluid being substantially uniformly distributed throughout said cavity and in fluid communication with each of said plurality of cells;
a first plurality of first electrically charged particles provided within each of said plurality of cells;
means for selectively applying a voltage to each of said plurality of first walls; and
means for applying a voltage to selected ones of said plurality of TFTs, wherein said voltage applied to said selected ones of said plurality of TFTs causes said selected TFTs to apply a voltage to a corresponding electrically conductive element to be one of: greater than a voltage applied to a corresponding one of said first walls and less than a voltage applied to a corresponding one of said first walls.

2. The display of claim 1, further comprising:
an insulating layer deposited on said electrically conductive elements.

3. The display of claim 1, further comprising:
a layer deposited on an inner surface of said second substrate.

4. The display of claim 3, wherein said layer is reflective and said particles are dark.

5. The display of claim 3, wherein said layer is dark and said particles are light.

6. The display of claim 5, wherein said particles are selected from a group consisting of: white and colored.

7. The display of claim 6, wherein said colored particles are selected from a group consisting of: red, blue, green.

8. The device according to claim 3, wherein said layer is an electrically conductive material.

9. The display of claim 1, wherein said first substrate and said electrically conductive elements are transparent.

10. The display of claim 1, further comprising:
a plurality of second walls extending substantially perpendicular from said second substrate, each of said plurality of second walls disposed substantially opposite from each of said plurality of first walls, wherein said gap is in an area between said plurality of seconds walls and said plurality of first walls.

11. The display of claim 1, wherein a thickness of each of the plurality of first walls is proportional to the height of the cavity.

12. The display of claim 1, wherein said cavity is sealed about perimeter thereof.

13. The display of claim 1 wherein said voltage applied to said electrically conductive element is applied using one of: an amplitude-based modulation and a time-based modulation.

14. The display of claim 1, wherein each of said plurality of first electrically charged particles provided within each of said cells has a size in a range of 10 nanometers to 5 microns.

15. The display of claim 1, wherein each of said plurality of particles within each of said cells has a size in a range of 10 nanometers to 5 microns.

16. An electrophoretic display device, comprising:
a substantially hollow container comprising:
a transparent substrate comprising:
one or more cathode electrodes supported by said transparent substrate forming a plurality of electronically and selectively addressable pixels;
a thin-film transistor active matrix substrate comprising one or more thin-film transistor driver circuits, each drive circuit being electrically coupled to an associated pixel;
one or more anode electrodes extending substantially perpendicular from, and supported on, an inner surface of said transparent substrate, each of said one or more anode electrodes interposed between corresponding cathode electrodes, and forming a plurality of open cells, wherein each of said one or more cathode electrodes is associated with one of said plurality of open cells;
a back substrate separated a selected distance from said transparent substrate, wherein a gap is formed between an upper surface of said anode electrodes and said back substrate;
a plurality of pigment particles provided within each of said cells; and
a substantially clear, substantially particle free, suspension fluid disposed in said container, wherein said fluid is distributed throughout said container via said gap and
means for applying a voltage to selected ones of said plurality of TFTs, wherein said voltage causes said selected TFTs to apply a voltage to a corresponding cathode electrode to be one of: greater than a voltage applied to a corresponding one of said anode electrodes and less than a voltage applied to a corresponding one of said anode electrodes.

17. The device according to claim 16, further comprising an electrode layer disposed on an inner surface of said back substrate.

18. The device according to claim 17, wherein said electrode layer comprises a reflective white material.

19. The device of claim 18, wherein said plurality of pigment particles comprises dark particles.

20. The device according to claim 17, wherein said electrode layer comprises a dark material.

21. The device according to claim 20, wherein said plurality of pigment particles comprises light particles.

22. The device according to claim 21, wherein said light particles are selected from the group consisting of: red, green, and blue.

23. The device of claim 16 further comprising a plurality of walls extending from said back substrate, said plurality of walls lying within a projection of said plurality of anode electrodes on said back substrate.

24. The device of claim 16, wherein each of said plurality of first electrically charged particles provided within each of said cells has a size in a range of 10 nanometers to 5 microns.

25. A display comprising:
 a first substrate, including:
  a transparent thin-film transistor (TFT) array comprising a plurality of thin film transistors (TFTs) arranged in an array of intersecting rows and columns;
  a plurality of first walls extending substantially perpendicular from said first substrate, said plurality of first walls creating a plurality of cells, each of said plurality of cells corresponding to one of said TFTs;
  an electrically conductive element within each of said cells, said electrically conductive element being electrical isolated from said plurality of walls, and in electrical contact with a TFT corresponding to one of said plurality of cells; and
 a second substrate comprising a layer, said second substrate positioned substantially opposite from said first substrate, said second substrate being separated from the first substrate by a known distance to form a cavity between the first and second substrate, wherein the plurality of walls extending from the first substrate have a distance less than the known distance, wherein a gap is formed between a top of the plurality of walls and an inner surface of the second substrate;
 a clear, substantially particle free, suspension fluid contained within said cavity, said suspension fluid being substantially uniformly distributed throughout said cavity and in fluid communication with each of the cells through said gap;
 a first plurality of electrically charged particles provided within each of said cells;
 means for applying a voltage to each of said plurality of first walls; and
 means for applying a voltage to selected ones of said plurality of TFTs, wherein said voltage applied to said selected ones of said plurality of TFTs causes said selected TFTs to apply a voltage to a corresponding electrically conductive element to be one of: greater than a voltage applied to a corresponding one of said first walls and less than a voltage applied to a corresponding one of said first walls.

26. The display of claim 25, wherein said voltage applied to said plurality of first walls is fixed.

27. The display of claim 26, wherein said voltage applied to selected ones of said plurality to TFTs is applied using at least one of: an amplitude-based modulation and a time-based modulation.

28. The display of claim 25, further comprising an insulating layer deposited on said first substrate and said electrically conductive element.

29. The display of claim 28, wherein said first substrate and said insulating layer are transparent.

30. The display of claim 25, wherein said second substrate and said layer are transparent.

31. The display of claim 25, wherein said plurality of particles is selected from a group consisting of: light, dark and colored.

32. The display of claim 31, wherein said colored particles are selected from a group consisting of: red, blue, green.

* * * * *